(12) United States Patent
Kind

(10) Patent No.: US 6,937,265 B2
(45) Date of Patent: Aug. 30, 2005

(54) TELECOMMUNICATIONS INSTALLATION

(75) Inventor: Volker Kind, Altenholz (DE)

(73) Assignee: DeTeWe-Deutsche Telephonwerke Aktiengesellschaft & Co., Berlin (DE)

( * ) Notice: Subject to any disclaimer, the term of this patent is extended or adjusted under 35 U.S.C. 154(b) by 194 days.

(21) Appl. No.: 10/182,319

(22) PCT Filed: Jan. 23, 2001

(86) PCT No.: PCT/DE01/00319

§ 371 (c)(1),
(2), (4) Date: Feb. 25, 2003

(87) PCT Pub. No.: WO01/56283

PCT Pub. Date: Aug. 2, 2001

(65) Prior Publication Data

US 2003/0161447 A1 Aug. 28, 2003

(30) Foreign Application Priority Data

Jan. 27, 2000 (DE) .......................................... 100 04 348

(51) Int. Cl.$^7$ ........................... H04N 7/14; H04M 11/00
(52) U.S. Cl. ................................... 348/14.01; 379/93.17
(58) Field of Search ........................... 348/14.01–14.16, 348/468, 552, 705, 564; 379/52, 93.17; 715/716; 725/110, 131, 36, 112

(56) References Cited

U.S. PATENT DOCUMENTS

| 4,995,071 | A |   | 2/1991 | Weber et al. |         |
|-----------|---|---|--------|--------------|---------|
| 5,424,770 | A | * | 6/1995 | Schmelzer et al. | 725/36 |

(Continued)

FOREIGN PATENT DOCUMENTS

| DE | 33 07 377  | C2 |   | 9/1984  |            |
|----|------------|----|---|---------|------------|
| DE | 38 23 219  | C1 |   | 5/1989  |            |
| DE | 92 07 423  | U1 |   | 11/1993 |            |
| DE | 43 29 173  | A1 |   | 3/1995  |            |
| DE | 195 48 296 | A1 |   | 6/1997  |            |
| DE | 196 31 939 | A1 |   | 2/1998  |            |
| DE | 197 52 507 | A1 |   | 6/1999  |            |
| EP | 0 513 609  | A2 |   | 11/1992 |            |
| EP | 0 641 128  | A1 |   | 3/1995  |            |
| EP | 0 762 763  | A2 |   | 3/1997  |            |
| EP | 0 773 659  | A2 |   | 5/1997  |            |
| EP | 0 781 023  | A2 |   | 6/1997  |            |
| JP | 03018192   | A  | * | 1/1991  | H04N/7/14  |
| WO | WO 98/34360 |   |   | 8/1998  |            |
| WO | WO 99/07143 |   |   | 2/1999  |            |

OTHER PUBLICATIONS

German Search Report dated May 10, 2004 for corresponding German application 100 04 348.8.

(Continued)

*Primary Examiner*—Wing Chan
(74) *Attorney, Agent, or Firm*—Christie, Parker and Hale, LLP

(57) ABSTRACT

The invention relates to a telecommunications installation (1) for transmitting video and/or audio signals. The telecommunications installation can be connected to at least one telecommunications terminal (3) provided with an image display device, especially a conventional videophone (3). According to the invention, a video signal generator (10) is provided which generates a video signal in a data format and data protocol that correspond to the telecommunications terminal (3). The video signal generator (10) also generates at least one additional video signal and transmits this at least one additional video signal alternatively to or in combination with the first video signal to the telecommunications terminal (3). The telecommunications installation (1) enables the users of telecommunications terminals, which are provided with an image display device, especially video phones (3), and which are connected to the telecommunications installation (1), to access functions of the telecommunications installation (1) even while utilizing another function.

8 Claims, 3 Drawing Sheets

U.S. PATENT DOCUMENTS 5,694,163 A * 12/1997 Harrison .................. 379/93.17
5,905,524 A    5/1999 Sauer
6,014,439 A    1/2000 Walker et al.
6,169,541 B1 *  1/2001 Smith ......................... 715/716

OTHER PUBLICATIONS

International Search Report of PCT/DE01/00319, dated Jul. 16, 2001.

International Preliminary Examination Report of PCT/DE01/00319, dated May 10, 2002.

English translation of International Preliminary Examination Report for corresponding International Application PCT/DE01/00319.

* cited by examiner

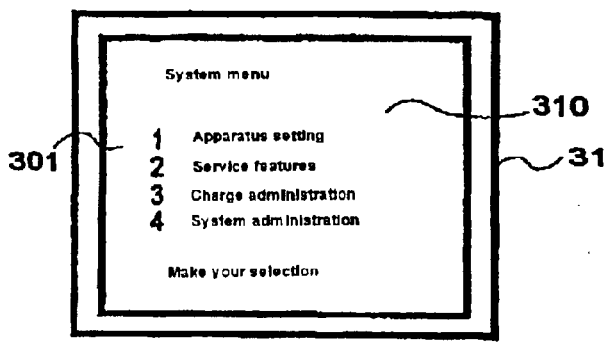
Fig. 3
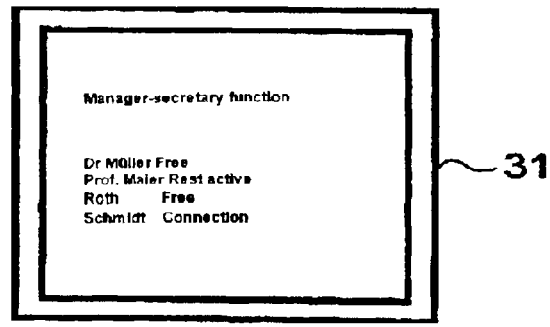
Fig. 4
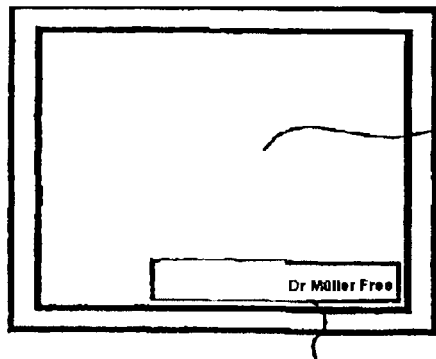
Fig. 5
Fig. 6

TELECOMMUNICATIONS INSTALLATION

CROSS-REFERENCE TO RELATED APPLICATION

This application claims priority of International application number PCT/DE01/00319, filed Jan. 23, 2001, which in turn claims priority of German application number 100 043 48.8, filed Jan. 27, 2000.

The invention relates to a telecommunications system for transmitting video and/or audio signals, as claimed in the precharacterizing clause of claim 1.

Conventional modern telecommunications systems ever more frequently also have an interface which allows the connection of video telephones. The telecommunications system transmits, inter alia, calls with audio and/or video signals between different subscribers to that system itself or to subscribers who can communicate with that system via the public telecommunications network.

The services which are available to users of video telephones are in this case restricted to the audio and/or video signals being passed on transparently between the subscribers. Further additional services, which the telecommunications system supports, may, on the other hand, be used for a video telephone only when this video telephone supports the services, that is to say the service features of the system must be available in the system terminals themselves. Such matching of the video telephone to the telecommunications system is expensive and inflexible, since it is restricted to operation with one specific system, or at least with systems from one specific manufacturer.

It is generally known in telecommunications technology for uncoded video signals to be converted to real-time-coded video signals matched to the terminal. For example, DE 196 31 939 A1 describes a video server which is able to identify the required data format and data protocol of a video telephone which is connected to the video server, and is then able to send video and audio signals to that video telephone in the respective data format and data protocol corresponding to that video telephone. This allows a large number of different video telephones to be served. The coded video and audio signals are produced by means of a large number of video and audio signal generators, which are selected on the basis of the data format and data protocol of the respective video telephone. Interactive control of the video server via the video telephone is likewise provided.

However, the functionality of this video server for the individual user is restricted to one service, namely the playing of videos. More far-reaching support for the services which are supported by telecommunications systems, in particular the simultaneous use of a number of services by one video telephone, is impossible.

The present invention is based on the object of providing a telecommunications system for transmitting video or audio signals, which allows the users of telecommunications terminals which are connected to the telecommunications system and have a video display apparatus, in particular video telephones, to access further services of the telecommunications system, even while using one service.

According to the invention, this object is achieved by a telecommunications system having the features of claim 1.

The video signal generator of the telecommunications system according to the invention for transmitting video and/or audio signals additionally produces at least one further video signal, and transmits this at least one further video signal as an alternative to or in combination with the one video signal to the telecommunications terminal.

The present invention considerably extends the capabilities which a telecommunications system can offer to the user of a commercially available video telephone, since the second video signal makes it possible for the telecommunications system to offer further video information even while transmitting the first video signal. In particular, this makes it possible to provide this additional video information during a telephone call in which video signals are also transmitted. In particular, the video signal generator also allows the combination of a number of video information items which are offered by the telecommunications system 1.

In one embodiment, the video signal generator overlays the at least one further video signal as a secondary picture in the first video signal. The combined video signal which is transmitted to the telecommunications terminal thus contains the first video signal as the main picture, and the at least one further video signal as a secondary picture.

In a further embodiment, the at least one further video signal contains user guidance information for programming service features of the telecommunications system by means of the keypad of the telecommunications terminal. In this case, the service features include all the service features which can be selected on a user-specific basis or globally and which the telecommunications system makes available not only to users of that telecommunications system but also to external users. In this way, the user of a telecommunications terminal with a video display apparatus is provided with the functionality of a system-specific system terminal, which allows the programming of the system.

In one variant, the at least one further video signal contains a selection menu, in which keypad codes are allocated to the menu fields.

Alternatively, the at least one further video signal contains information relating to the status of the telecommunications system and/or telecommunications terminals which are connected to the telecommunications system. The system can thus be programmed without suppressing access to other services.

When a number of audio or video telephones are connected to one telecommunications system, a so-called "manager-secretary function" can be implemented for the telecommunications terminal, in which, on receiving a call which is intended for another subscriber, the secretary can provide the information that this subscriber's telecommunications terminal is busy.

In a further variant, at least one video monitoring camera is provided, which produces the at least one further video signal. In this way, the telecommunications system is provided with the additional functionality of a monitoring system.

If the video monitoring camera is connected via a local computer network to the telecommunications system, a computer which is provided in the computer network evaluates the monitoring images, which are supplied from the video monitoring camera, for movements, and, if a maximum image change rate is exceeded, the monitoring images and/or a warning signal are supplied to the video signal generator.

This makes the monitoring process easier for the person carrying out the monitoring, and the monitoring can also easily be carried out together with other activities.

Alternatively, the monitoring camera may also be connected directly to the telecommunications system, which supplies the monitoring images, which are supplied from the monitoring camera, directly to a telecommunications terminal which is connected to the telecommunications system.

It is also possible to connect a number of monitoring cameras directly or via a local computer network to the telecommunications system, with these monitoring cameras each emitting their own video signal (monitoring signal), with the signal which is produced by the video signal generator comprising a combination of a number of monitoring signals or a cyclic sequence of the monitoring signals.

In one variant, an e-mail interpreter is provided, which produces the connection for an e-mail server, which interprets information in the e-mails, converts them to video signals and supplies these video signals to the video signal generator. The user of the telecommunications terminal can thus use his video display apparatus to read the e-mails intended for him. In this case, the expression interpretation should be understood as meaning the conversion of the e-mail information to video information which can be processed by the video signal generator.

In this case, it is advantageous if the at least one further video signal includes automatic signaling on receipt of e-mails.

In a further variant, a browser is provided, which produces a connection for Internet or Intranet sites, interprets information from the Internet or Intranet sites, and supplies this information to the video signal generator.

At the locations at which an Internet or Intranet site contains cross-references to other sites, the browser can overlay a unique number in addition on that page, such that the browser supports the navigation between the Internet or Intranet sites by entering numbers via the keypad of the telecommunications terminal, so that the system provides the user of the telecommunications terminal with a complete Internet or Intranet browser.

In a further embodiment, at least one video memory for storing video information is provided with a control device. The control unit supplies the stored video information to the video signal generator, on request by the video signal generator.

In one variant, the video memory is integrated in the telecommunications system.

Alternatively, the video memory may be provided in a local computer network which is connected to the telecommunications system via a network interface. This is particularly advantageous when large amounts of data have to be processed and when the memory media in an already existing computer network can be used.

Further details, features and advantages of the invention may be found in the following description of a number of exemplary embodiments, with reference to the drawings, in which:

FIG. 3 shows a selection menu which is generated by the video signal generator in the telecommunications system;

FIG. 4 shows one variant of a selection menu which is generated by the video signal generator in the telecommunications system;

FIG. 5 shows one embodiment of a "manager-secretary function" in the main picture;

FIG. 6 shows one embodiment of a "manager-secretary function" with a secondary picture overlaid in the main picture;

Figure 1:
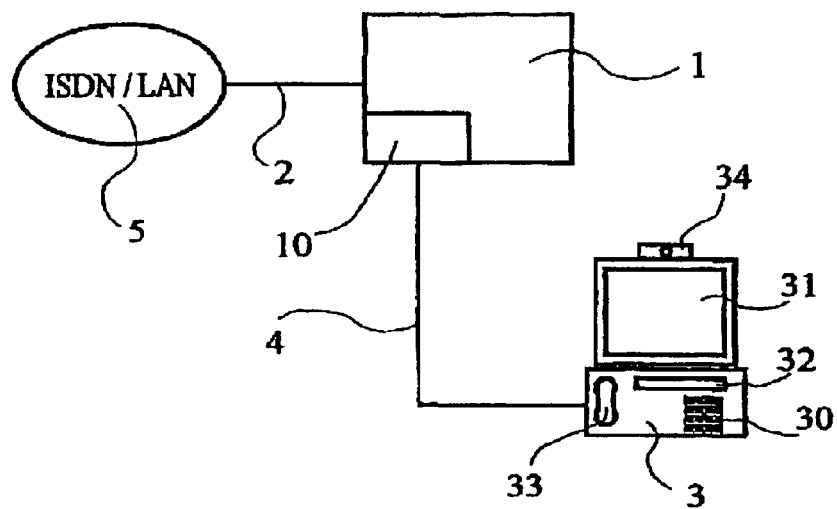
FIG. 1 shows a schematic design of a telecommunications system with a video signal generator.

FIG. 1 shows a telecommunications system 1 which has an interface 2 to a higher-level network, for example an analog or digital public (ISDN) network 5, or else to lower-level internal networks (local area network LAN).

The telecommunications system 1 has an interface 4 to which a commercially available and system-independent telecommunications terminal with a video display apparatus can be connected, in this case a video telephone 3. The interface 4 may be a radio interface or a landline-based interface. The interface 4 between the video telephone 3 and the telecommunications system 1 is used for transmitting audio and video signals, using a data format and data protocol as appropriate for the video telephone 3 and the type of interface. At the moment, various data protocols standards exist for the various types of interfaces in this case. Here, by way of example, the H.320 standard for video telephony via 64 kBit/s channels, the H.321 standard for video telephony via broadband ISDN or ATM interfaces, the H322 and H323 standards for video telephony via TCP/IP connections, and the H.324 standard for video telephony via analog connections should be mentioned, although transfer to future standards will be possible, without any problems.

The video telephone 3 has a telephone keypad 30, a video display apparatus in the form of a screen 31 for displaying received video signals, a listening and speech device 33 as well as a video camera 34. In addition, a further display 32 may be provided, for displaying short text information items, control characters, symbols or the like.

The telecommunications system 1 contains a video signal generator 10 which is used for generating video signals which are passed via the interface 4 to the video telephone 3, and which the video telephone 3 displays on the screen 31. In this case, it makes no difference to the video telephone 3 whether the video signal is generated by the system or whether this is a video signal passed on in a transparent manner from some other video telephone. In both cases, it receives a video signal in a data format and data protocol which can be processed by it.

In addition to providing a first video signal which is produced by the video signal generator 10, the telecommunications system 1 according to the invention is also able to produce a second video signal for the video telephone 3. Firstly, the second video signal may be transmitted by interrupting the transmission of the first video signal and by transmitting the second video signal via the interface 4 to the video telephone 3 instead of the first video signal. Secondly, it is possible for the first and the second video signal to be combined, and for this combined video signal to be supplied to the video telephone. Such a combination of video signals is produced by overlaying the video image transmitted by the second video signal into the video image transmitted by the first video signal, in the form of a secondary picture. The technical implementation of overlaying has itself been known for a relatively long time from television technology, so that reference is made to already available methods and apparatuses for this purpose.

Figure 2:
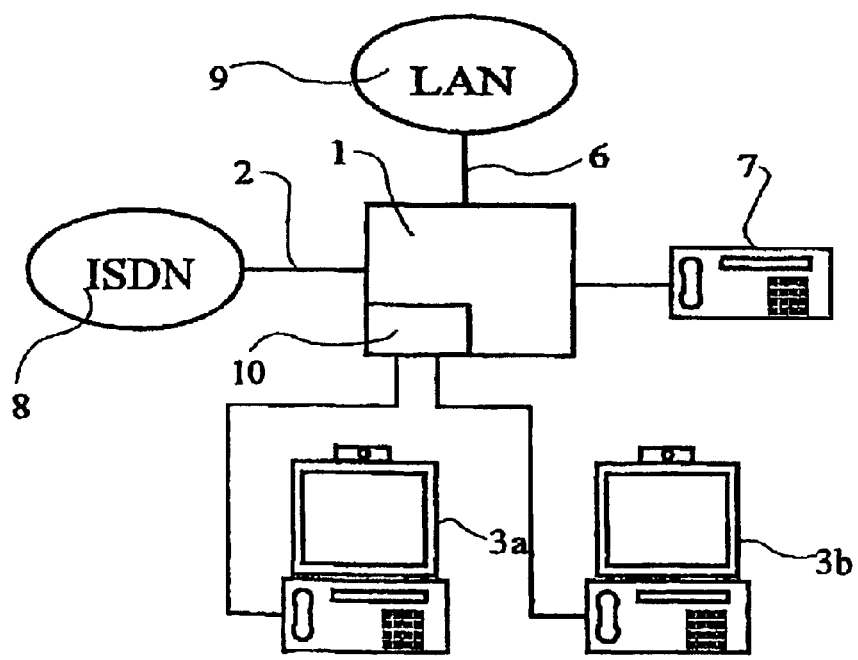
FIG. 2 shows one embodiment of a telecommunications system with a video signal generator and a number of video telephones.

FIG. 2 shows a telecommunications system 1 to which, in addition to a first video telephone 3a, other communications terminals such as a second video telephone 3b and an audio telephone 7 are also connected. In this case, the interface 2 allows access to a public (ISDN) network 8, via which a connection can be produced for other video telephones. The capability to access a local area network (LAN) 9 via an interface 6 is also becoming ever more important these days, in order to allow access to computer services in this local computer network.

The present invention considerably extends the capabilities which a telecommunications system can offer to the user of the commercially available video telephone, since the second video signal makes it possible for the telecommunications system to supply further video information to the video telephone even while transmitting the first video signal. This also allows, in particular, the combination of a number of services which are offered by the telecommunications system 1.

FIGS. 3 and 4 each symbolically show a video picture which contains a control menu which allows the user of the video telephone to select the service features of a telecommunications system using the video telephone keypad 30 as shown in FIG. 1. The major advantage in this case is that the video telephone is available for other services even while programming the telecommunications system. Thus, for example, incoming calls, e-mails etc., can be signaled in a secondary picture on the screen 31 of the video telephone.

A control menu such as this, which is produced by the video signal generator 10 as shown in FIG. 1, is preferably entered by selecting a predetermined code number or special key on the video telephone keypad 30. The special keys "*" and "#" which are normally provided nowadays are particularly suitable for this purpose, possibly in combination with other keys. Modern video telephones frequently also have other special keys, which can be allocated in an appropriate manner. In response to this request, the telecommunications system produces a switching connection to the video telephone, which normally includes a signaling channel for interchanging signaling information and a user channel in which the user data, in this case the audio and video signals, are transmitted.

As illustrated in FIG. 3, the individual menu items 310 may in this case be displayed on the screen 31 of the video telephone as text lines including a selection number 301 or an input field. The selection of the illustrated menu items 310 or an input to an input field is made by selecting the appropriate numbers or number combinations on the video telephone keypad.

Alternatively, as illustrated in FIG. 4, the correct menu item 310 can first of all be selected on the screen by operating predetermined navigation keys, using which it is possible to jump backward and forward between the individual menu items. The selection of the appropriate menu item 310 is then confirmed by a predetermined confirmation key. The input to a selected input field for changing settings is likewise confirmed via the keypad of the video telephone. The coding of the keys, that is to say the action which can be triggered by the keys, is in this case displayed on the screen 31, for user guidance.

The selection process is particularly simple in the case of video telephones which are equipped with touch screens since, in this case, a selection can be made directly by touching the menu item on the screen.

As shown in FIGS. 5 and 6, the telecommunications system can use the second video signal, while a video telephone is being used for a call, to indicate the status to the user of the video telephone, in particular the fact that further video telephones or audio telephones which are connected to the telecommunications system are busy. The indication of the status of interfaces for other telecommunications networks such as the network interface or the interface to the public network is likewise envisaged.

This allows a so-called "manager-secretary function" to be supported for a video telephone 3. When a service feature such as this is implemented, a secretary who receives a call for his or her manager on his or her video telephone may have the status of the manager's extension, which may be a video telephone or an audio telephone, displayed visually on the screen 31. The status is overlaid either on request by the user of the video telephone by selection of a key on the keypad, or automatically. Automatic overlaying is particularly worthwhile when a video telephone is receiving a telephone call in which only audio signals are transmitted, and the screen 31 is not required for the purposes of that call.

In this case, the video signal generator in the telecommunications system can convert the audio call to a video telephony call, with the audio information for this call originating from the audio call, and the status display being inserted as video information.

In this case as well, the entire screen can be used for the display, as is shown in FIG. 5, with the video signal of the telephone call being briefly interrupted, the menu being overlaid on the video signal, and the video signal for the telephone call then being transmitted once again. It may be advantageous to display the status of all the telecommunications terminals in a department, group or else in the entire company, from which a person can then be selected whose extension is not busy.

FIG. 6 shows the automatic overlaying of the information that another video telephone or audio telephone is busy as an "on-screen display" in the form of a small secondary picture 320 in addition to the main picture 324 on the screen 31 of the video telephone. The size and position of the overlaid secondary picture 320 are in this case chosen such that it covers only small portions of the main picture 324, and interferes as little as possible with the call itself.

A further application of this automatic overlaying is for the so-called "ringing" of a further caller to be signaled not only acoustically by means of a ringing tone but also visually. For this purpose, the video signal generator produces a video signal for the video telephone, which includes an overlaid telephone number of the caller and, possibly, further available information about the caller.

The telecommunications system according to the invention also offers the capability, however, to provide other information which is useful for the user of the video telephone, in the form of video information. During the call, it is possible to display the call duration and the telephone costs incurred so far either in numerical form or as a graphic, for example in the form of a progress bar.

Furthermore, a telephone directory function may be provided, to inform the user of the video telephone of internal or else external telephone numbers. The number is in this case dialed by selection via the screen, as described above.

Furthermore, for example, in-house short messages, important personal appointment times, system errors and very much more can be displayed on the screen of the video telephone. In some circumstances, this may be done in combination with an audio signal. A personal schedule planner may even be implemented in the telecommunications system.

A further important application of the telecommunications system is for video conference circuits, both between subscribers who are connected directly to the telecommunications system and are equipped with video telephones and persons who are connected via the public network. In the case of video signals, and in contrast to an audio conference circuit, it is impossible to simply mix the signals from the subscribers. It is thus envisaged that the picture of that subscriber who is currently talking will be transmitted, by monitoring the volume level of the subscribers. A circuit must, of course, be provided in this case to prevent the picture from being switched backward and forward continuously for short periods, and for making a suitable selection when two people are speaking at the same time. It is also possible to provide for additional text or video information to be overlaid.

Figure 7:
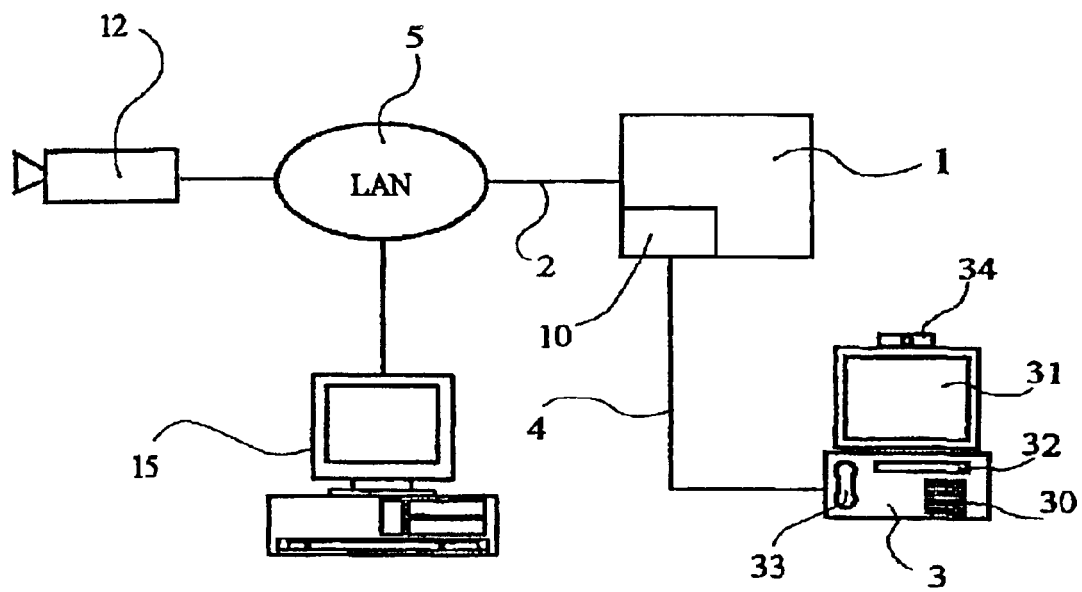
FIG. 7 shows one embodiment of a telecommunications system with a monitoring function by means of a video camera which is connected to a LAN and, FIG. 8 shows one variant of the telecommunications system with a monitoring function as shown in FIG. 7, with a video camera which is connected directly to the telecommunications system.
Figure 8:
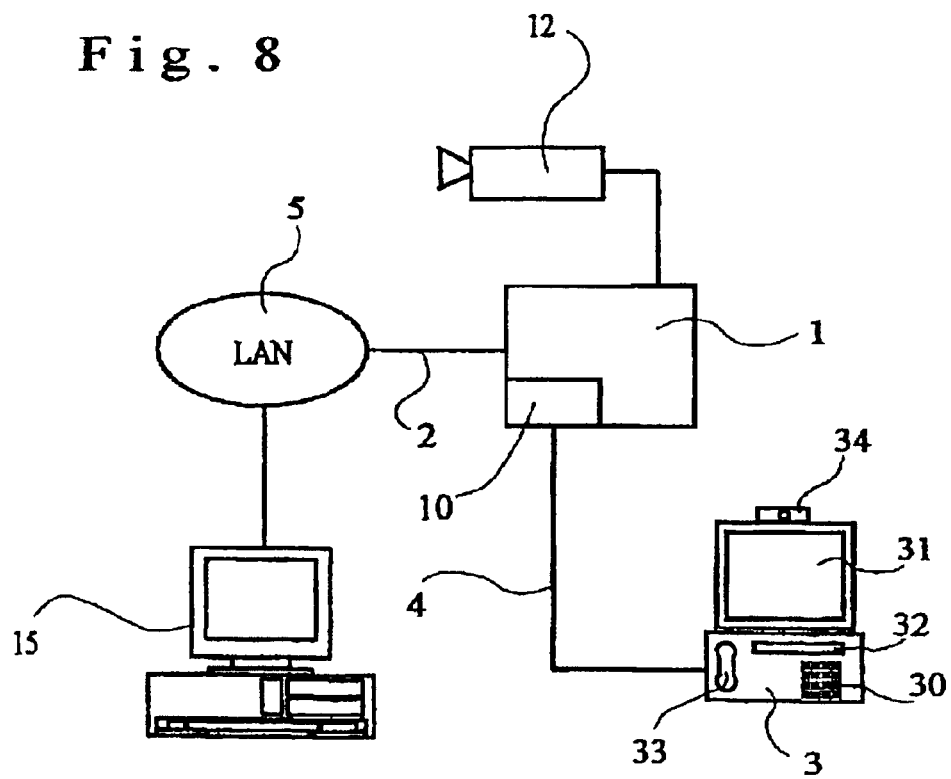

FIGS. 7 and 8 show a telecommunications system 1 which supports safety or security functions, in particular monitoring functions. The simplest option is to produce a connection for a monitoring camera 12 for the users of video telephones 3 which may be connected to the telecommunications system 1 via a LAN 5 as shown in FIG. 7, or may be connected directly to the telecommunications system 1 as shown in FIG. 8.

The video signal generator 10 may be used to display a number of pictures from different monitoring cameras 12 alongside one another on the screen 31 of the video telephone 3. The picture from one monitoring camera 12 may also be displayed as the main picture, with the pictures from other monitoring cameras being displayed as secondary pictures. It is particularly advantageous for the main picture to be selected cyclically from the various monitoring pictures. This also includes the display of one monitoring picture as a secondary picture, while another application, for example a video telephone call, is supplying the main image. In this way, the video telephone 3 is provided with the function of a monitoring terminal, which allows even large areas to be monitored, but with other functions being possible in parallel.

Cameras and microphones are installed in the safety or security relevant areas for an extended safety or security system. The audio and video signal is passed to the LAN 5, where it is processed further and is evaluated by a computer 15. A limit value is predetermined for the maximum volume and the maximum permissible change in the recorded image for each monitoring point. If the maximum volume or the maximum change in the image is exceeded, the video signals are automatically supplied via the telecommunications system 1 to the video telephone 3 of the safety or security official, who is then able to see the situation audiovisually, and, if appropriate, to initiate measures.

In addition, it is possible to record the monitoring images which are supplied from the monitoring camera 12 at specific intervals, automatically, and to store them for a predetermined time, in order to allow them to be evaluated, if required. In this case, it is also advantageous to use the network interface described above to the LAN in order to store the data in bulk data storage facilities which are provided in the LAN.

Such a monitoring function using the telecommunications system may also be used for monitoring the patients in a hospital or in an old people's home. The picture supplied from a monitoring camera is supplied from the telecommunications system to a video telephone, allowing the doctor or carer to take action quickly in the event of emergencies.

One extended monitoring capability for the users of video telephones is for the telecommunications system either to pass a combination of a number of monitoring signals to one video telephone, or to pass the video signals from various monitoring cameras on cyclically to the video telephone.

A further safety or security-relevant application of a telecommunications system is a video door intercom device. This may be implemented by connecting a camera to the telecommunications system via the $S_0$ bus. The operation of the bell button results in the telecommunications system selecting a predetermined video telephone. As soon as the user takes the call, he or she sees the visitor on the screen and can then use the telephone handset to communicate via the audio channel with the visitor. The video display improves the security level against opening the door for undesirable visitors.

If the telecommunications system allows access to the user's e-mails by means of an e-mail interpreter, received e-mails can also be provided as video signals for the video telephone, by means of the telecommunications system. A service such as this is once again requested by selection of a predetermined key on the keypad. The video signal generator in the telecommunications system then first of all generates an overview menu relating to the received e-mails for that video telephone, with the menu items being selected in the manner described above. The selection of an e-mail via the keypad leads to the corresponding e-mail being displayed as the picture contents on the video telephone. The user can then delete the e-mail, switch back to the overview menu or carry out other actions by selecting specific numbers or special characters.

Incoming e-mails may also be signaled automatically. This may be done by overlaying a secondary picture or else by means of a moving information bar, running across the screen at the top or bottom. Additional signaling by means of an audio signal may be worthwhile when the messages are important.

In addition to receiving e-mails, the capability to send e-mails is also worthwhile. First of all, the e-mail address of the recipient is entered, or is selected from a selection list. Since the entry of texts via a telephone keypad would be too complex, it is envisaged that audio and/or video e-mails will be sent, which are recorded via the telephone, are buffer-stored in the telecommunications system, and are then sent.

If the telecommunications system has access to sites on the Internet or an Intranet, then the invention offers the capability for these sites to be displayed as picture contents on the video telephone. A precondition for this is that the telecommunications system includes a browser which is able to interpret the HTML format or other formats, that is to say to convert these formats to information which can be processed by the video signal generator. Once again, this service feature may be requested by selection of a key.

After setting up a connection between the telecommunications system and the video telephone, the browser accesses a predefined Internet or Intranet site, and passes this in interpreted form to the video signal generator, which converts it to video signals, and transmits them to the video telephone. At points at which the Internet or Intranet site contains cross-references to other sites (so-called hyperlinks), the telecommunications system automatically overlays numbers in the picture. Selection of such a number allows the user of the video telephone to access the display of the site which has been referred to. This makes it possible to navigate through the Internet, with the browser assisting the navigation process in the case of cross-references to other HTML documents automatically by overlaying numbers in the picture, which can then be selected by the video telephone:

A language school may also use the telecommunications system for uncommon languages, for which the subscribers cannot be expected to physically participate in courses owing to the long traveling distance or due to physical impairment. For this purpose, the subscribers must be connected to the public network by means of an ISDN connection, and must be equipped with a video telephone. At the start of the course session, the language school calls the subscribers, and a video conference circuit is set up. Via the video signal generator, in addition to the transmission of the main picture, the language teacher can overlay further video signals, for example the spellings for vocabularies, from a computer-aided control terminal, as a secondary picture. Furthermore, it is possible for the language teacher to provide the subscribers with preprepared training videos or interactive computer applications, as well. At the points at which the subscriber is intended to practice pronouncing words, the application is provided with a speech recognition algorithm, which assesses the subscriber's pronunciation. In addition to a language school this application may, of course, also be used for distance learning or for distance teaching of children in remote areas.

It is also possible for those with hearing difficulties who are connected to the public network via a video telephone to telephone those without hearing difficulties considerably more easily by means of the telecommunications system. If the person without any hearing difficulties likewise has a video telephone, the video signal generator can also automatically overlay the words spoken by the subscriber to the call in the form of text, in a further improvement to the speech recognition programs.

The person with the hearing difficult can see his or her call partner and can at the same time perceive their words via the text.

The embodiment of the invention is not restricted to the preferred exemplary embodiments described above. In fact, a number of variants are feasible, which also make use of the telecommunications system according to the invention for fundamentally different types of embodiment.

What is claimed is:

1. A telecommunications apparatus for transmitting video and/or audio signals comprising:

at least one telecommunications terminal; and a video signal generator coupled to the at least one telecommunications terminal for producing a first video signal in a data format and data protocol appropriate to the at least one telecommunications terminal, and for producing at least one further video signal and transmitting the at least one further video signal to the at least one telecommunications terminal wherein the at least one further video signal includes user guidance information for programming service features of the telecommunications apparatus by means of a keypad of the at least one telecommunications terminal.

2. The telecommunications apparatus as claimed in claim 1, wherein the video signal generator produces the at least one further video signal for a secondary picture to be overlaid in a main picture produced by the first video signal, on a screen of a video telephone.

3. The telecommunications apparatus as claimed in claim 1, wherein the video signal generator combines the at least one further video signal with the first video signal for transmission to the at least one telecommunications terminal.

4. The telecommunications apparatus as claimed in claim 1, wherein the at least one further video signal produces a selection menu including individual menu fields on a screen of the at least one telecommunications terminal, in which keypad codes are allocated to the individual menu fields.

5. The telecommunications apparatus as claimed in claim 1 or 2, wherein the at least one further video signal includes information relating to a status of the telecommunications apparatus and/or a status of the at least one telecommunications terminal.

6. The telecommunications apparatus as claimed in claim 5, wherein the status information is a busy state of another audio telephone or video telephone coupled to the telecommunications apparatus.

7. The telecommunications apparatus as claimed in claim 1, further comprising at least one monitoring camera for generating the at least one further video signal.

8. The telecommunications apparatus as claimed in claim 1, wherein the video signal generator interrupts the transmission of the first video signal and transmits the at least one further video signal to the at least one telecommunications terminal instead.

* * * * *